United States Patent
Hancey

(12)
(10) Patent No.: US 10,906,736 B1
(45) Date of Patent: Feb. 2, 2021

(54) DEBRIS COLLECTOR FOR COLLECTING DEBRIS TO PREVENT FALLING ON THE GROUND

(71) Applicant: Scott Hancey, Pine, CO (US)

(72) Inventor: Scott Hancey, Pine, CO (US)

( * ) Notice: Subject to any disclaimer, the term of this patent is extended or adjusted under 35 U.S.C. 154(b) by 127 days.

(21) Appl. No.: 16/184,290

(22) Filed: Nov. 8, 2018

(51) Int. Cl.
| | | |
|---|---|---|
| *B65F 1/00* | (2006.01) | |
| *B23Q 11/00* | (2006.01) | |
| *B08B 1/00* | (2006.01) | |
| *B08B 1/04* | (2006.01) | |

(52) U.S. Cl.
CPC ............ *B65F 1/0013* (2013.01); *B08B 1/008* (2013.01); *B08B 1/04* (2013.01); *B23Q 11/0053* (2013.01); *B23Q 11/0071* (2013.01); *B65D 2313/06* (2013.01); *B65D 2313/08* (2013.01)

(58) Field of Classification Search
CPC ............... B65F 1/0013; B23Q 11/0053; B23Q 11/0071; B08B 7/0028; B08B 1/04
USPC ...................................... 220/480; 15/104.002
See application file for complete search history.

(56) References Cited

U.S. PATENT DOCUMENTS

| | | | |
|---|---|---|---|
| 4,955,984 A | 9/1990 | Cuevas | |
| 8,967,923 B2 | 3/2015 | Lerch et al. | |
| 9,914,585 B1 * | 3/2018 | Alberti ................... | B65F 1/0013 |
| 10,040,156 B2 * | 8/2018 | Castillo .............. | B23Q 11/0071 |
| 2004/0134004 A1 * | 7/2004 | Kaleta ...................... | A47L 13/52 |
| | | | 15/104.002 |
| 2004/0262315 A1 * | 12/2004 | Yoon ..................... | B65D 43/162 |
| | | | 220/480 |
| 2009/0286581 A1 * | 11/2009 | Hsiao ...................... | H04M 1/17 |
| | | | 455/575.8 |
| 2018/0346173 A1 * | 12/2018 | Mayer ................. | B65B 67/1233 |

* cited by examiner

*Primary Examiner* — Mollie Impink
(74) *Attorney, Agent, or Firm* — Sanchelima & Associates, P.A.; Christian Sanchelima; Jesus Sanchelima

(57) ABSTRACT

A debris collector that collects debris and prevents the debris from falling on the ground is disclosed. The debris collector includes a collector bin and at least one cling element. The collector bin collects debris and is collapsible for easy portability. The cling element clings the collector bin on a substantially flat surface underneath where an operation such as drilling is required to be performed such that debris, falling while drilling, drop into the collector bin and prevents debris from falling on the ground. The cling element is at least one layer of adhesive. The debris collector collects debris formed during various operations. The debris collector further includes a closure element for closing the debris collector after debris has been collected. Further included is a cleaning tool or debris collecting element that facilitates collecting debris that has fallen on the ground.

10 Claims, 2 Drawing Sheets

DEBRIS COLLECTOR FOR COLLECTING DEBRIS TO PREVENT FALLING ON THE GROUND

BACKGROUND OF THE INVENTION

1. Field of the Invention

The present disclosure relates to a debris or dust collector. More particularly, the present disclosure relates to a debris collector for collecting debris and prevents debris from falling on the ground.

2. Description of the Related Art

While drilling on a wall, debris falls on the ground thus making the place messy. Hence, there is a need for a debris collector that collects debris and prevents them from falling on the ground.

Several designs for debris collector have been designed in the past. None of them, however, includes a debris collector that is easily portable, structurally less complex and inexpensive.

Applicant believes that a related reference corresponds to a U.S. Pat. No. 8,967,923 filed by AEG Electric Tools GmBH for Dust suction device for drilling machine. The patent '923 discloses a dust suction device for detachable attachment to a hand-held drilling machine in which dust is collected in a dust collection container by a suction fan operable by an electric motor. However, the dust suction device has a number of mechanical components that increase purchasing and operational costs.

Another related application is U.S. Pat. No. 4,955,984 by Levearn Cuevas for providing a safety debris catcher. The patent '984 discloses a safety debris catcher that is easily and readily connected to and detached from an operating tool or device. However, the safety debris catcher disclosed in the reference '984 is to be fitted on the tool and thus increases dead weight of the tool to be hand-held by the user.

Other documents describing the closest subject matter provide for a number of more or less complicated features that fail to solve the problem in an efficient and economical way. None of these patents suggest the novel features of the present invention.

SUMMARY OF THE INVENTION

It is an object of the present invention to provide a debris collector that collects debris and prevents them from falling on the ground.

It is yet another object of the present invention to provide a debris collector that is easily portable to various places in an inoperative configuration and easily fitted to collect debris defining an operative configuration.

It is another object of the present invention to provide a debris collector that is structurally simple and inexpensive.

It is still another object of the present subject matter to provide a debris collector that has a collector bin that collects debris.

It is still another object of the present subject matter to provide a debris collector that can be opened and collapsible facilitating ease of portability.

It is another object of the present invention to provide a debris collector that has an at least one cling element that clings collector bin on a substantially flat surface like a wall.

It is another object of the present invention to provide a debris collector that is an independent component and not integral with or attached to a tool like a drilling tool and thereby enabling ease of use.

It is another object of the present invention to provide a debris collector that facilitates easy carrying of collected debris from one place to another by closing debris collector.

It is another object of the present invention to provide a debris collector that facilitates collecting of debris fallen on ground or a substantially flat surface.

Further objects of the invention will be brought out in the following part of the specification, wherein detailed description is for the purpose of fully disclosing the invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
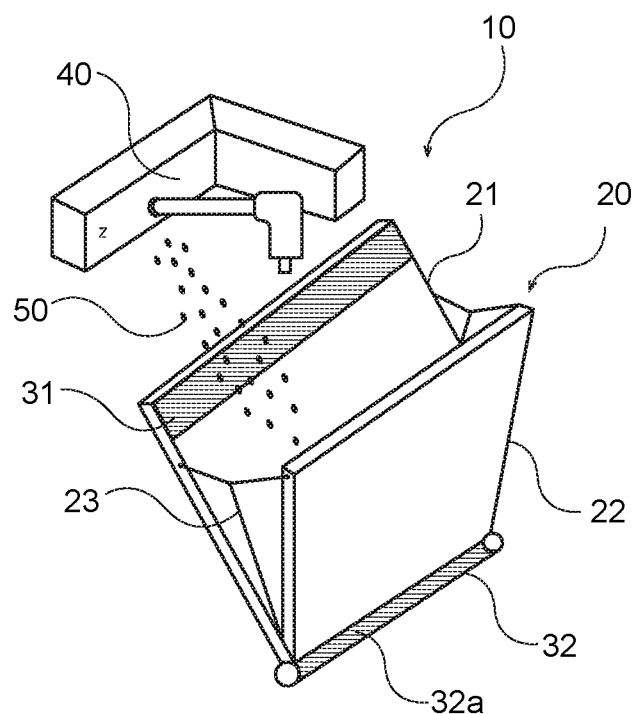
FIG. 1 represents a schematic view of the present invention in its operating environment showing a collector bin 20 in an operative open configuration disposed underneath a drilling zone 'Z' and collecting debris 50 falling from drilling zone 'Z'.
Figure 2:
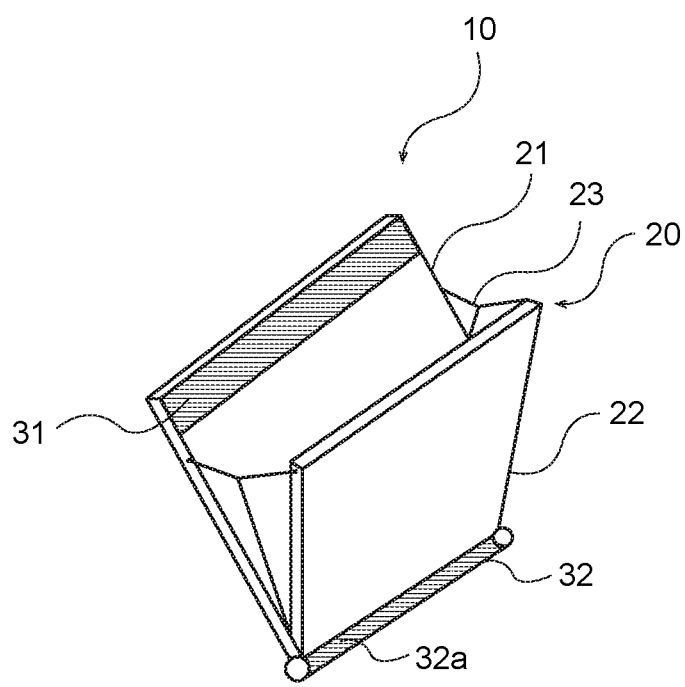
FIG. 2 represents an isometric view of collector bin 20 in operative open configuration.
Figure 3:
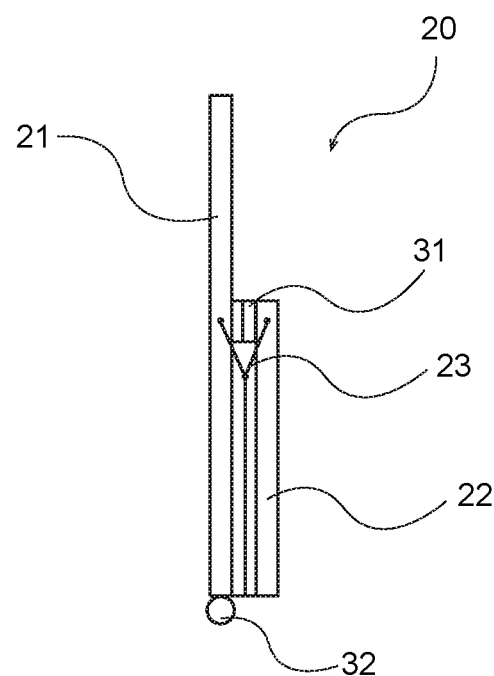
FIG. 3 shows an isometric view of collector bin 20 in an operative collapsed configuration.
Figure 4:
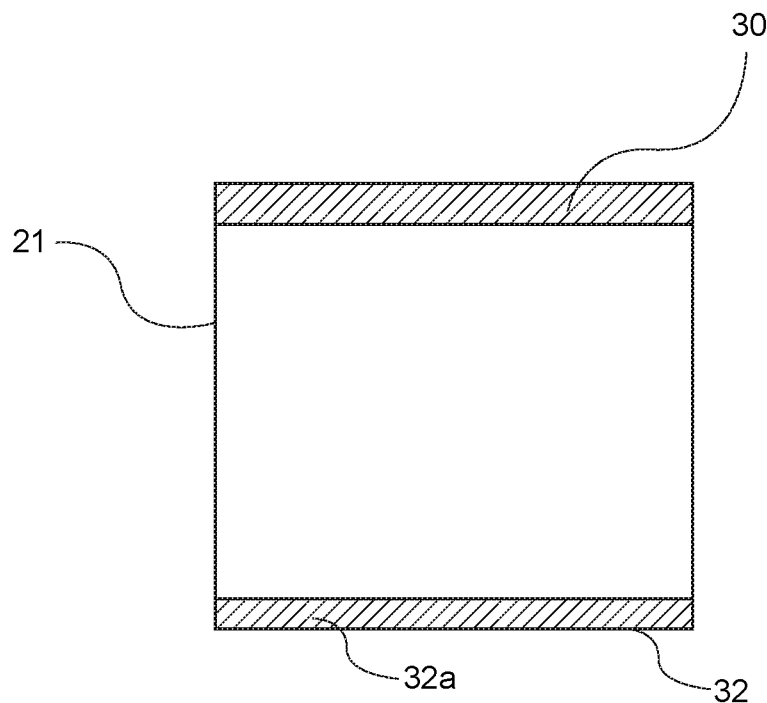
FIG. 4 illustrates a back view of collector bin 20 provided with a cling element 30 that is a layer of adhesive.

Referring now to the drawings, FIGS. 1-4, where the present invention is generally referred to with numeral 10, it can be observed that a debris collector, in accordance with one embodiment, is provided that includes a collector bin 20 and at least one cling element 30.

Collector bin 20 is used to collect debris 50. In one embodiment, collector bin 20 comprises a stationary portion 21 and a collapsible portion 22. Stationary portion 21 is clingable to a substantially flat surface 40 that is a wall. Collapsible portion 22 is connected to stationary portion 21 by at least one collapsible element 23. Collapsible element 23 manipulates stationary portion 21 and collapsible portion 22 to be in an operative open configuration and an operative closed configuration. In an operative open configuration, stationary portion 21 and collapsible portion 22 act as a bin and receives/collects debris 50 therewithin. In an operative closed configuration, stationary portion 21 and collapsible portion 22 are folded and hence is easy for portability. Collector bin 20 can be made of a flexible material or a rigid material.

Cling element 30 clings collector bin 20 on substantially flat surface 40 such that collector bin 20 in operative open configuration collects debris 50 therein before falling on the ground and thus prevents debris 50 from falling. In one embodiment, cling element 30 is clingable a number of times at different substantially flat surface. For example, suppose if a number of different walls need to be drilled then cling element 30 enables removing and clinging collector bin 20 from each wall and thus is re-usable.

In another embodiment, cling element 30 is used only one time and can be replaceable by another cling element 30. The cling element 30 can be at least one layer of adhesive or can be vacuum cups or can be hangable on existing nails or can be provided with legs to stand on a surface or provided with hooks to hang collector bin on ladder or on any other rod-like structure.

In one additional embodiment, debris collector 10 further includes a closure element 31 is provided to close stationary portion 21 and collapsible portion 22 such that debris collected in the debris collector 10 is prevented from falling out. Thus, closure element 31 in closed configuration facilitates easy carrying of debris in debris collector 10 without causing debris to fall therefrom. Closure element 31 can be an adhesive layer, Velcro, buttons or locks.

In another additional embodiment, debris collector 10 further includes an adhesive roller 32 that is coated with an adhesive layer 32a. When adhesive roller 32 is contacted with debris fallen on ground or a flat surface, like a surface top of a table, debris clings to adhesive layer 32a thus cleaning ground or flat surface. Though the present disclosure is described with adhesive layer 32a coated on adhesive roller 32, however, adhesive layer 32a can also be a stationary component disposed anywhere on debris collector 10. Also, instead of adhesive layer 32a any other cleaning tool/debris collecting element, such as vacuum suction, can be used that can clean debris fallen on ground or surface.

As illustrated cling element 30, closure element and adhesive roller 32 with adhesive layer 32a are independent and individual components, however, any one component can perform multiple activities such as cling element 30 can be used for clinging with wall and additionally be used to perform function of cleaning like adhesive layer 32a.

Debris collector 10 is positioned and clings on a surface underneath the surface where an operation such as drilling is required to be performed also known as drill zone 'Z'. Thus, when a drilling operation is performed, debris 50 falling while drilling is collected in debris collector 10. Debris collector 10 can be used to collect debris 50 formed during various operations performed by drill, hammer drill or stud guns.

Debris collector 10 can be used for collecting debris such as drywall compound, spackle residue or plaster. Also, debris collector 10 to collect dust while sanding wall patches. Debris collector 10 can also be used while performing a wall painting activity to collect paint drops. Debris collector 10 can also be used for collecting debris while cleaning electrical boxes or during fitting of electrical boxes and for collecting cut-out wires, pipes or the like. Debris collector 10 is also used while nailing a nail on a wall to collect debris while performing nailing operation. Debris collector 10 can also be used as a pouch to hold various hardware articles like nails, screws, washers and the like. Debris collector 10 can also be used as a pouch to place keys, papers, bills or magazines. Debris collector 10 is also fitted nearby a machine or in an office or storage place for holding working manuals/instruction manuals of a machine.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A debris collector comprising:
   a) a collector bin;
   b) at least one cling element configured to cling said collector bin onto a substantially flat surface such that said collector bin collects falling debris within before the debris falls onto a ground surface, said at least one cling element extends an entire length of said collector bin on a rear side of said collector bin; and
   c) an adhesive roller with an adhesive layer to collect and clean the debris which has fallen onto the ground surface, said adhesive roller extending the entire length of said collector bin, said adhesive roller being exposed and entirely below said collector bin, said adhesive roller being in constant abutting contact with said collector bin, said adhesive layer extending an entire length of said adhesive roller.

2. The debris collector as claimed in claim 1, wherein said collector bin includes a stationary portion attachable to said substantially flat surface and a collapsible portion attached to and collapsible with said stationary portion.

3. The debris collector as claimed in claim 2, further includes a closure element, said closure element sealing said collector bin such that the debris collected within the collector bin remains within said collector bin and does not fall out.

4. The debris collector as claimed in claim 3, wherein said closure element is in abutting contact with said stationary portion and extends an entire length of said stationary portion, said closure element being entirely above said collapsible portion when said collector bin is opened.

5. The debris collector as claimed in claim 3, wherein said closure element is between said stationary portion and said collapsible portion when said collector bin is sealed.

6. The debris collector as claimed in claim 3, wherein said closure element is in constant abutting contact with said stationary portion and said collapsible portion simultaneously when said collector bin is sealed.

7. The debris collector as claimed in claim 1, wherein said at least one cling element is re-usable to cling said collector bin onto a number of surfaces.

8. The debris collector as claimed in claim 1, wherein said at least one cling element is at least one layer of adhesive.

9. The debris collector as claimed in claim 1, wherein said cling element is replaceable by another of said at least one cling element for reusing said collector bin.

10. The debris collector as claimed in claim 1, wherein said at least one cling element and said adhesive roller are parallel to each other.

* * * * *